United States Patent [19]

Suzuki

[11] Patent Number: 4,636,045
[45] Date of Patent: Jan. 13, 1987

[54] MANUAL ADJUSTING DEVICE FOR TILTABLE OUTER MIRROR

[75] Inventor: Masaru Suzuki, Chiryu, Japan

[73] Assignee: Kabushiki Kaisha Tokai Rika Denki Seisakusho, Aichi, Japan

[21] Appl. No.: 645,906

[22] Filed: Aug. 29, 1984

[30] Foreign Application Priority Data

Sep. 1, 1983 [JP] Japan ................................ 58-161445
Dec. 7, 1983 [JP] Japan .......................... 58-189652[U]

[51] Int. Cl.⁴ ............................ G02B 5/08; G02B 5/10
[52] U.S. Cl. ..................................... 350/606; 350/632
[58] Field of Search ..................... 350/606, 632, 633

[56] References Cited

U.S. PATENT DOCUMENTS 3,533,681 10/1970 Glaser ................................. 350/606
4,171,648 10/1979 Manzoni ........................ 350/606 X
4,464,017 8/1984 Wada .

FOREIGN PATENT DOCUMENTS 99688 2/1984 European Pat. Off. ............ 350/606
57-60941 4/1982 Japan ................................. 350/606
58-105845 6/1983 Japan ................................. 350/606
58-177735 10/1983 Japan ................................. 350/606

Primary Examiner—John K. Corbin
Assistant Examiner—Richard F. Gallivan
Attorney, Agent, or Firm—Jackson & Jones

[57] ABSTRACT

A manual adjusting device for a tiltable outer mirror of a motor vehicle, including a bearing member for supporting a mirror member, an operating lever, a coupling member, a driving arm detachably mounted on the coupling member, and an arm holder such that a distal end of the driving arm and the arm holder are engaged with each other at a position deviated in the forward direction of the motor vehicle from the bearing member.

18 Claims, 4 Drawing Figures

MANUAL ADJUSTING DEVICE FOR TILTABLE OUTER MIRROR

BACKGROUND OF THE INVENTION

The present invention generally relates to a motor vehicle and more particularly to, a device for manually adjusting attitudes of a mirror member of each of a pair of outer mirrors from a cabin of the motor vehicle.

In door mirrors of motor vehicles, so-called tiltable outer mirrors are well known in which a mirror visor is tilted upon application of a large external force thereto and is retained at the tilted attitude. In the tiltable outer mirrors, a mechanism for adjusting attitudes of a mirror member tiltably supported in the mirror visor is provided and is in some cases replaced by an electrical or manual remote adjusting device for remotely adjusting attitudes of the mirror member of each of the outer mirrors from the cabin.

However, in the case of the known tiltable outer mirrors, since the tilting angle of the mirror visor is large, it is difficult to provide a manual adjusting shaft without interference between the manual adjusting shaft and the mirror visor, the expensive electrical remote adjusting device has been generally required to be employed.

SUMMARY OF THE INVENTION

Accordingly, an essential object of the present invention is to provide an improved manual adjusting device for a tiltable outer mirror having a large tilting angle, which is remarkably inexpensive.

Another important object of the present invention is to provide an improved manual adjusting device of the above described type which is highly reliable in actual use and can be readily incorporated into motor vehicles and the like at low cost.

In accomplishing these and other objects according to one preferred embodiment of the present invention, there is provided an improved manual adjusting device for a tiltable outer mirror of a motor vehicle including a mirror visor, a mirror member tiltably supported by said mirror visor and a mirror stay formed with a rotary shaft and attached to each of opposite outer side faces of said motor vehicle such that said mirror visor is pivotally mounted on said mirror stay through said rotary shaft, said manual adjusting device comprising: a bearing member for supporting said mirror member, which is disposed at a position deviated from an axis of said rotary shaft; an operating lever which extends from an inside of said motor vehicle into said mirror stay towards said mirror visor and is so supported by said mirror stay as to be rotatable and pivotal in forward and rearward directions of said motor vehicle; a coupling member which includes a shaft portion and an arm portion; said shaft portion being rotatably and axially movably supported by said rotary shaft coaxially with said rotary shaft; said arm portion being formed, at a distal end portion thereof, with an engaging recess such that a distal end of said operating lever and said engaging recess are engaged with each other at a first engaging position deviated from an axis of said operating lever in one of the forward and rearward directions of said motor vehicle; a detachable engaging means; a driving arm which is detachably mounted on an end portion of said shaft portion through said detachable engaging means such that said driving arm and said end portion of said shaft portion are disengaged from each other upon application of a predetermined torque to said detachable engaging means; and an arm holder for supporting said driving arm, which is attached to said mirror member such that a distal end of said driving arm and said arm holder are engaged with each other at a second engaging position deviated in the forward direction of said motor vehicle from said bearing member.

In accordance with the present invention, attitudes of the mirror member can be, respectively, adjusted in the upward and downward directions of the motor vehicle and in the horizontal direction of the motor vehicle by rotating the operating lever about its axis and pivoting the operating lever in the forward and rearward directions of the motor vehicle.

Furthermore, in accordance with the present invention, since the operating lever is disengaged from the coupling member during pivoting of the mirror visor, the mirror visor can be freely tilted over a large angle.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
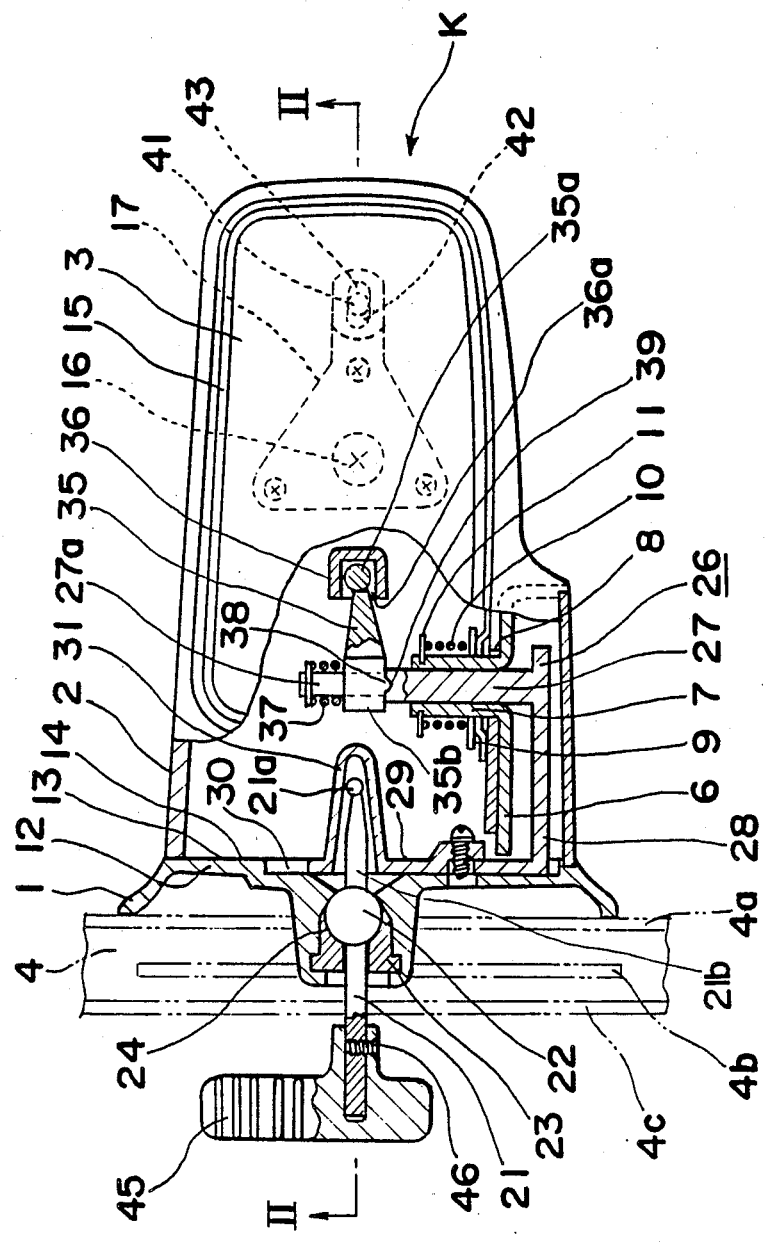
FIG. 1 is a partially cutaway front elevational view of a manual adjusting device for a tiltable outer mirror, according to one preferred embodiment of the present invention.
Figure 2:
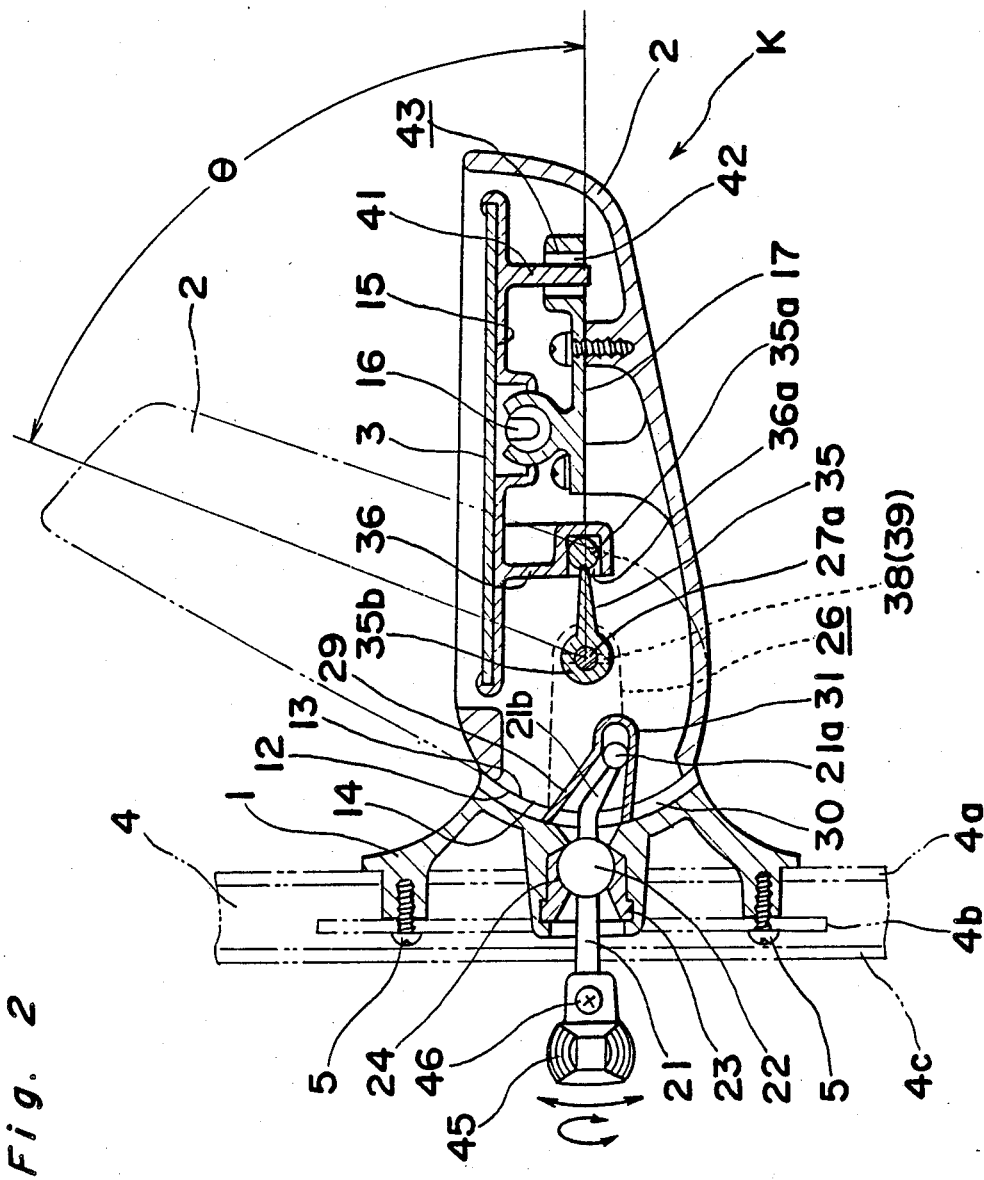
FIG. 2 is a cross-sectional view taken along the line II—II in FIG. 1.

Referring now to the drawings, there is shown in FIGS. 1 and 2, a manual adjusting device K for a tiltable outer mirror, according to one preferred embodiment of the present invention. The tiltable outer mirror generally includes a mirror stay 1, a mirror visor 2 and a mirror member 3. The mirror stay 1 is attached to each of opposite sides, for example, doors of a motor vehicle 4 with machine screws 5. An annular rotary shaft 7 extending upwardly is formed on a support arm 6 extending substantially horizontally from a lower portion of the mirror stay 1 so as to be inserted through an opening 8 of the mirror visor 2. Furthermore, a detent spring 10 is wound around the rotary shaft 7 so as to be interposed between a detent member 9 disposed at a lower portion of the rotary shaft 7 and a spring retainer 11 secured to an upper portion of the rotary shaft 7. Thus, the mirror visor 2 is rotatably mounted on the mirror stay 1 so as to be rotated about the rotary shaft 7. The mirror stay 1 is formed with a cylindrical concave surface 12 having an axis identical with that of the rotary shaft 7, while the mirror visor 2 is formed with a cylindrical convex surface 13 corresponding to the concave surface 12. The concave surface 12 and the convex surface 13 constitute an interface 14 between the mirror stay 1 and the mirror visor 2. The concave surface 12 and the convex surface 13 are brought into sliding contact with each other at the time of pivoting of the mirror visor 2. The mirror member 3 is supported by a mirror holder 15. The mirror holder 15 is tiltably supported, through a ball bearing portion 16, by a mounting plate 17 secured to the mirror visor 2.

The manual adjusting device K generally includes an operating lever 21 and a U-shaped coupling member 26. The operating lever 21 extends from an inside of the motor vehicle 4 into the mirror stay 1 towards the mirror visor 2 and is formed with a spherical portion 22. The operating lever 21 has a bent shaft portion 21b extending from the spherical portion 22 and a spherical end 21a formed on a distal end of the bent shaft portion 21b. The spherical portion 22 is supported by a spherical bearing 24 formed by both the mirror stay 1 and a bushing 23 secured to the mirror stay 1, whereby the operating lever 21 is so mounted on the mirror stay 1 as to be rotatable about an axis of the operating lever 21 and pivotal in the forward and rearward directions of the motor vehicle 4, i.e., in the downward and upward directions in FIG. 2 with the spherical portion 22 as its fulcrum.

The coupling member 26 includes a shaft portion 27, an arm portion 28 and a coupling plate 29 such that the shaft portion 27 and the coupling plate 29 extend upwardly from opposite ends of the arm portion 28, respectively. The shaft portion 27 is rotatably and axially movably fitted through the rotary shaft 7 so as to be supported coaxially with the rotary shaft 7. The arm portion 28 extends below the support arm 6 horizontally from a lower end of the shaft portion 27 to the interface 14. The coupling plate 29 is attached to one end of the arm portion 28 so as to extend upwardly therefrom to the operating lever 21. The coupling plate 29 is accommodated in a guide recess 30 formed in the mirror stay 1 and is formed, at one end thereof, with an engaging recess 31 projecting into the mirror visor 2 such that the spherical end 21a of the operating lever 21 is inserted into the engaging recess 31. The bent shaft portion 21b is disposed rearwardly of the mirror member 3 and is inclined in a direction remote from the mirror member 3, i.e. in the forward direction of the motor vehicle 4 (in the downward direction in FIG. 2) such that the engaging recess 31 is disposed at a position deviated from the axis of the operating lever 21 in the forward direction of the motor vehicle 4. It can be also so arranged that the engaging recess 31 is disposed at a position deviated from the axis of the operating lever 21 in the rearward direction of the motor vehicle 4. The shaft portion 27 has a small diameter portion 27a extending out of the rotary shaft 7 into the mirror visor 2.

The manual adjusting device K further includes a driving arm 35 and an arm holder 36 for supporting the driving arm 35. The driving arm 35 is mounted on the small diameter portion 27a and has a spherical end 35a formed at a distal end thereof and a sleeve portion 35b fitted around the small diameter portion 27a of the shaft portion 27. The arm holder 36 is integrally formed with the mirror holder 15 and has an engaging recess 36a formed at a distal end thereof such that the spherical end 35a of the driving arm 35 is engaged with the engaging recess 36a. The sleeve portion 35b is depressed downwardly by a coiled spring 37 after having been fitted around the small diameter portion 27a such that the driving arm 35 is mounted on the shaft portion 27. The sleeve portion 35b has a V-shaped projection 38 formed at a bottom face thereof, while the small diameter portion 27a has a V-shaped groove 39 formed at a lower end thereof such that the V-shaped projection 38 is engaged with the V-shaped groove 39. Thus, the shaft portion 27 and the driving arm 35 are usually rotated together with each other through engagement of the V-shaped projection 38 with the V-shaped groove 39. However, when a large torque is applied to the mirror visor 2, the driving arm 35 is pushed upwardly against an urging force of the coiled spring 37, so that the projection 38 and the groove 39 are disengaged from each other and thus, the shaft portion 27 and the driving arm 35 are uncoupled from each other. Meanwhile, the engaging recess 36a of the arm holder 36 has such dimensions that the spherical end 35a of driving arm 35 is rotatably supported by the engaging recess 36a without any play therebetween.

A guide member 43 is disposed outwardly of the ball bearing portion 16 in the sidewise direction of the motor vehicle 4 such that the ball bearing portion 16 is interposed between the guide member 43 and the engaging recess 36a. The guide member 43 is composed of a guide pin 41 extending rearwardly from the mirror holder 15 and an elongated opening 42 formed in the mounting plate 17. The elongated opening 42 extending in the sidewise direction of the motor vehicle 4 receives the guide pin 41 so as to regulate upward and downward movements of the guide pin 41. It is to be noted that the engaging recess 36a is provided rearwardly of the mirror member 3 so as to be deviated in the forward direction of the motor vehicle 4, i.e., in the downward direction in FIG. 2 from the ball bearing portion 16. At the same time, the engaging recess 36a is disposed at a position deviated inwardly in the sidewise direction of the motor vehicle 4 from the ball bearing portion 16. An operating knob 45 is secured to one end of the operating lever 21 disposed in the cabin of the motor vehicle 4 by using a countersunk screw 46. Reference numerals 4a, 4b and 4c denote an outer side panel, an inner side panel and an interior trim, respectively.

By the above described arrangement of the manual adjusting device K, when the operating lever 21 is rotated about its axis by manipulating the operating knob 45, the spherical end 21a is displaced in the upward and downward directions of the motor vehicle 4, i.e., in the upward and downward directions in FIG. 1 since the operating lever 21 has the bent shaft portion 21b. Thus, the driving arm 35 is also displaced in the upward and downward directions of the motor vehicle 4 through the coupling member 26 so as to drive the arm holder 36 in the upward and downward directions of the motor vehicle 4. Since the engaging recess 36a of the arm holder 36 is provided rearwardly of the mirror member 3 so as to be deviated in the forward direction of the motor vehicle 4 from the ball bearing portion 16 as described above, the upward and downward movements of the arm holder 36 are converted into rotary motions of the mirror holder 15 so as to rotate the mirror holder 15 about the ball bearing portion 16, so that the mirror holder 15 is tilted in the upward and downward directions of the motor vehicle 4. Meanwhile, when the operating knob 45 is displaced in the forward and rearward directions of the motor vehicle 4, i.e., in the downward and upward directions in FIG. 2, the coupling member 26 is rotated about the shaft portion 27 so as to rotate the driving arm 35, so that the arm holder 36 is displaced in the forward and rearward directions of the motor vehicle 4 and thus, the mirror holder 15 is tilted horizontally with the ball bearing portion 16 as its fulcrum. Consequently, it becomes possible to arbitrarily adjust attitudes of the mirror holder 15, namely the mirror member 3 through remote handling of the manual adjusting device K from the cabin of the motor vehicle 4. Furthermore, since the mirror member 3 is displaced in the same direction as in the operating lever 21, it becomes easy to manipulate the operating lever 21.

Meanwhile, in the case where the mirror visor 2 is pivoted about the rotary shaft 7 upon application of an external force to the mirror visor 2, the projection 38 is disengaged from the groove 39, so that the driving arm 35 is uncoupled from the shaft portion 27 and thus, is pivoted together with the mirror visor 2. Accordingly, since the pivoting of the mirror visor 2 is regulated only by the detent member 9, it becomes possible to freely tilt the mirror visor 2 over a large angle $\theta$ to a position, for example, shown by the two-dot chain lines in FIG. 2. Then, when the mirror visor 2 is returned to its normal position shown by the solid lines in FIG. 2, the projection 38 is again brought into engagement with the groove 39 such that the driving arm 35 is pivoted together with the shaft portion 27.

Furthermore, various engaging means for bringing the driving arm 35 and the coupling member 26 into detachable engagement with each other can be employed in place of the coiled spring 37, projection 38 and groove 39. For example, it can be also so arranged that at least one of the driving arm 35 and the coupling member 26 is made of elastic material and is deflected when subjected to a torque exceeding a predetermined value so as to disengage the arm 35 and the coupling member 26 from each other.

Figure 3:
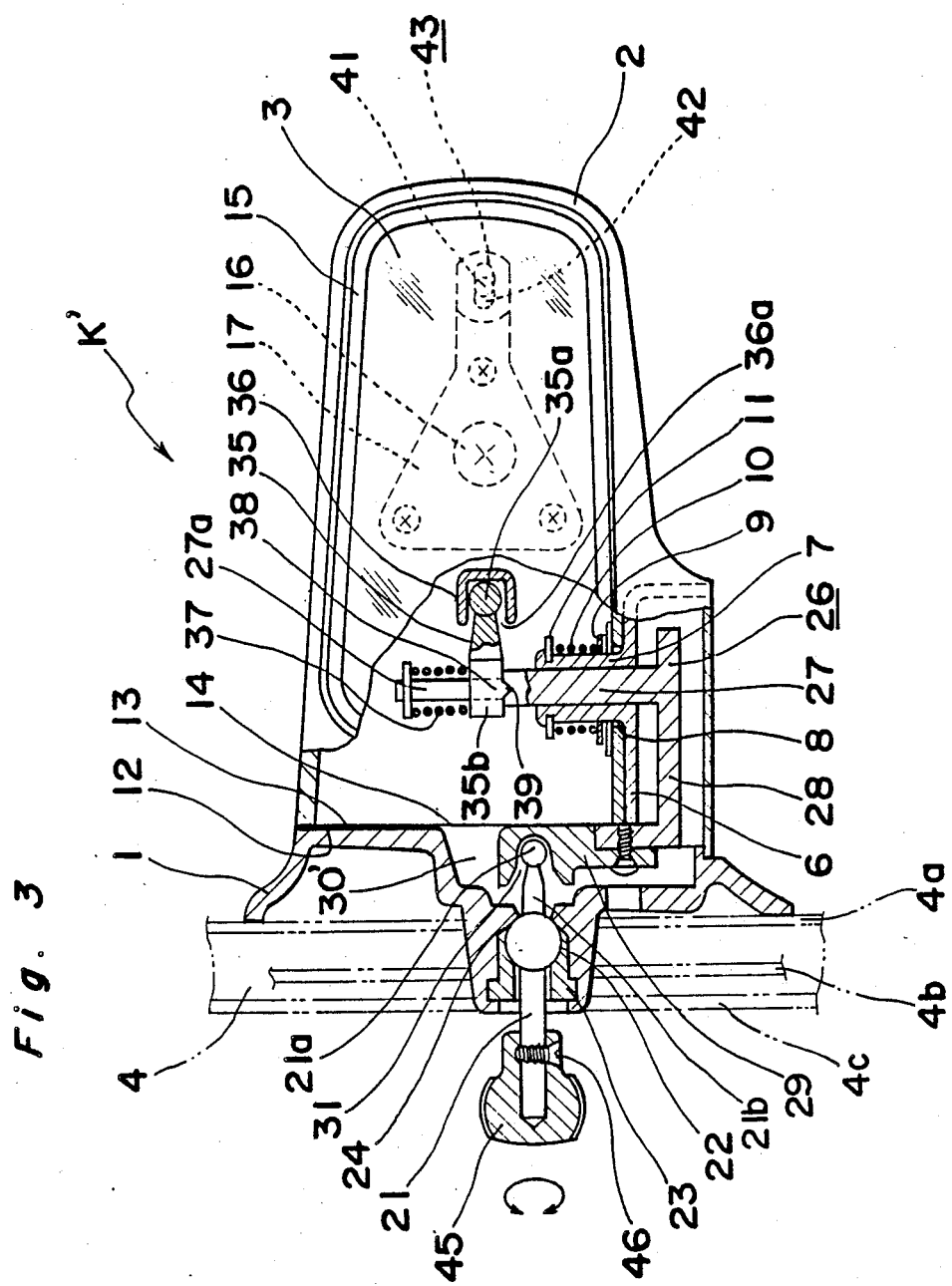
FIGS. 3 and 4 are views similar to FIGS. 1 and 2, respectively, particularly showing a modification thereof.
Figure 4:
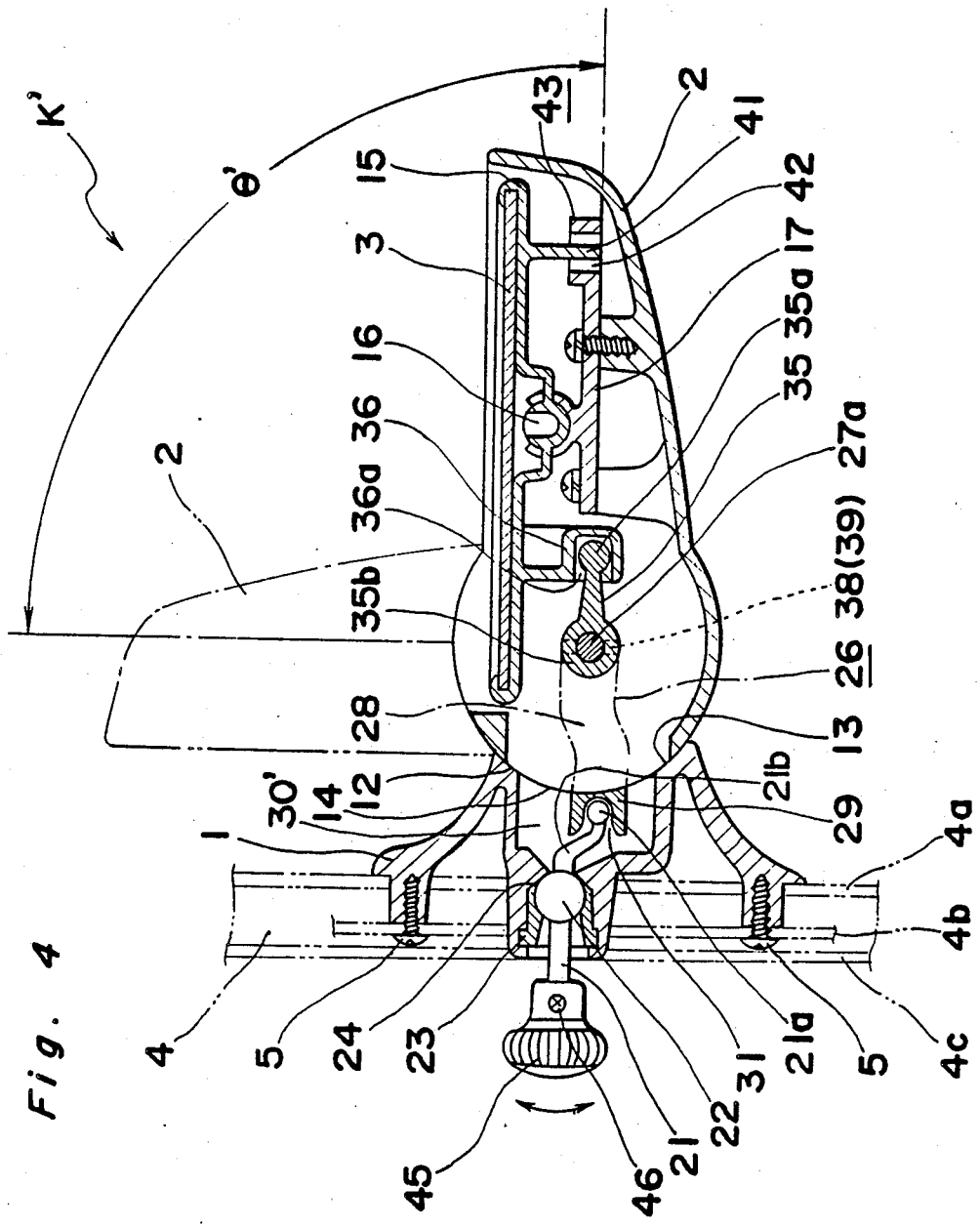

Referring to FIGS. 3 and 4, there is shown a manual adjusting device K' which is a modification of the manual adjusting device K. In the modified manual adjusting device K', the guide recess 30 of the manual adjusting device K is replaced by an opening 30' defined by the mirror stay 1. In the modified manual adjusting device K', the arm portion 28 of the coupling member 26 extends beyond the interface 14 into the mirror stay 1 such that the coupling plate 29, i.e., the engaging recess 31 is accommodated in the opening 30'. Since the arm portion 28 and the coupling plate 29 of the coupling member 26 extend outwardly of the mirror visor 2 into the opening 30', there is no member which projects beyond the interface 14 into the mirror visor 2 so as to prevent free pivoting of the mirror visor 2. Accordingly, it becomes possible to freely tilt the mirror visor 2 over a large angle $\theta'$ to a position shown by the two-dot chain lines in FIG. 4, with the angle $\theta'$ being greater than the angle $\theta$ of the manual adjusting device K. Since other constructions of the modified manual adjusting device K' are similar to those of the manual adjusting device K, detailed description thereof is abbreviated for the sake of brevity.

In accordance with the present invention, the mirror visor can be freely pivoted over a large angle and attitudes of the mirror member can be manually adjusted arbitrarily.

Furthermore, in accordance with the present invention, the manual adjusting device which is simple in structure, inexpensive and easy to operate as compared with electrical adjusting devices can be obtained.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A manual adjusting device for a tiltable outer mirror of a motor vehicle including a mirror visor, a mirror member tiltably supported by said mirror visor and a mirror stay formed with a rotary shaft and attached to an outer side face of said motor vehicle such that said mirror visor is pivotally mounted on said mirror stay through said rotary shaft, said manual adjusting device comprising:
    a bearing member for supporting said mirror member, which is disposed at a position deviated from an axis of said rotary shaft;
    an operating lever which extends from an inside of said motor vehicle into said mirror stay towards said mirror visor and is so supported by said mirror stay as to be movable in two modes;
    a coupling member having a shaft portion;
    said shaft portion being rotatably and axially movably supported by said rotary shaft coaxially with said rotary shaft;
    said shaft portion being rotated by the motion of said operating lever in one of said modes, and axially moved by the motion of said operating lever in the other of said modes;
    a detachable engaging means;
    a driving arm which is detachably mounted on an end portion of said shaft portion through said detachable engaging means such that said driving arm and said end portion of said shaft portion are disengaged from each other upon application of a predetermined torque to said detachable engaging means; and
    an arm holder for supporting said driving arm, which is attached to said mirror member such that a distal end of said driving arm and said arm holder are engaged with each other at an engaging position deviated in the forward direction of said motor vehicle from said bearing member.

2. A manual adjusting device as claimed in claim 1, wherein said arm portion extends outwardly of said mirror visor up to an interface between said mirror stay and said mirror visor such that said first engaging position is deviated from said interface into said mirror visor.

3. A manual adjusting device as claimed in claim 2, wherein said detachable means includes a projection formed on one of said driving arm and said shaft portion and a groove formed on the other one of said driving arm and said shaft portion such that said projection and said groove are detachably engaged with each other.

4. A manual adjusting device as claimed in claim 3, wherein said detachable engaging means further includes a spring for urging said projection and said groove into engagement with each other.

5. A manual adjusting device as claimed in claim 3, wherein at least one of said driving arm and said shaft portion is made of elastic material and is deflected upon application of said predetermined torque thereto so as to disengage said projection from said groove.

6. A manual adjusting device as claimed in claim 1, wherein said arm portion extends outwardly of said mirror visor beyond an interface between said mirror stay and said mirror visor into said mirror stay such that said first engaging position is deviated from said interface into said mirror stay.

7. A manual adjusting device as claimed in claim 6, wherein said detachable engaging means includes a projection formed on one of said driving arm and said shaft portion and a groove formed on the other one of said driving arm and said shaft portion such that said projection and said groove are detachably engaged with each other.

8. A manual adjusting device as claimed in claim 7, wherein said detachable engaging means further includes a spring for urging said projection and said groove into engagement with each other.

9. A manual adjusting device as claimed in claim 7, wherein at least one of said driving arm and said shaft portion is made of elastic material and is deflected upon application of said predetermined torque thereto so as to disengage said projection from said groove.

10. A manual adjusting device as claimed in claim 1, wherein said detachable engaging means includes a projection formed on one of said driving arm and said shaft portion and a groove formed on the other one of said driving arm and said shaft portion such that said projection and said groove are detachably engaged with each other.

11. A manual adjusting device as claimed in claim 10, wherein said detachable engaging means further includes a spring for urging said projection and said groove into engagement with each other.

12. A manual adjusting device as claimed in Claim 10, wherein at least one of said driving arm and said shaft portion is made of elastic material and is deflected upon application of said predetermined torque thereto so as to disengage said projection from said groove.

13. A manual adjusting device as claimed in Claim 1, further including a guide member for regulating upward and downward movements of said mirror member, which is disposed at a position deviated from said bearing member in a sidewise direction of said motor vehicle.

14. An outer mirror for use on motor vehicles which is tiltable in a horizontal direction upon the application of a large force external to the cabin of the vehicle comprising:

(a) a mirror stay adapted to be attached to an outer side of the motor vehicle;

(b) a mirror visor pivotally mounted on the mirror stay about an axis to be moveable in a horizontal direction upon the application of a large force external to the cabin of the vehicle;

(c) a mirror member tiltably supported on the mirror visor about a bearing member to permit the mirror member to be adjusted in an upward and downward direction and in a horizontal direction relative to the vehicle;

(d) an operating lever mounted on the stay and arranged to have one end thereof extend inside of the motor vehicle for movement by the vehicle operator, the other end of the lever extending towards said one end of the mirror visor, the lever being moveable in two modes;

(e) coupling means extending between said other end of the operating lever and the mirror member to cause the mirror member to tilt in a horizontal direction relative to the vehicle when said one end of the lever is moved in said one mode, and to cause the mirror member to tilt in an upward or downward direction relative to the vehicle when said one end of the lever is moved in the other mode, the coupling means including means extending along said axis about which the mirror visor is pivotally mounted for uncoupling said other end of the operating lever from the mirror member upon the application of a predetermined force to the mirror visor to permit the mirror visor and mirror member to pivot in unison relative to the mirror stay while the operating lever remains in a substantially stationary position relative to the mirror stay.

15. The mirror of claim 14 wherein the mirror stay includes a first vertically aligned shaft and the mirror visor is rotatably mounted on the shaft.

16. The mirror of claim 15 wherein the coupling means includes a second vertically aligned shaft extending through said first shaft, the second shaft being arranged to rotate in response to movement of the lever in said one mode, and to move in an axial direction in response to movement of the lever in said other mode.

17. The mirror of claim 16 wherein the coupling means further includes detachably engaging means extending between the second shaft and the mirror member for allowing the mirror visor and mirror member to rotate about the axis of the first and second shaft upon the application of said predetermined force.

18. The mirror of claim 17 wherein the coupling means further includes an arm mounted on second shaft extending between the second shaft and the mirror member, and detent means extending between the arm and second shaft to cause the arm to rotate with the second shaft in the absence of the application of said predetermined force and to rotate relative to the second shaft upon the application of said predetermined force.

* * * * *